United States Patent
Jywe et al.

(10) Patent No.: US 8,111,405 B2
(45) Date of Patent: Feb. 7, 2012

(54) AUTOMATIC SCAN AND MARK APPARATUS

(75) Inventors: Wen-Yuh Jywe, Huwei Chen (TW);
Chien-Hung Liu, Huwei Chen (TW);
Hung-Shu Wang, Huwei Chen (TW);
Bo-Wei Chen, Huwei Chen (TW);
Jyun-Jia Yang, Huwei Chen (TW);
Wei-Cheng Tsai, Huwei Chen (TW);
Wei-Chung Chang, Huwei Chen (TW);
Ming-Chi Chiang, Huwei Chen (TW);
Jia-Hong Chen, Huwei Chen (TW)

(73) Assignee: National Formosa University, Yunlin Hsien (TW)

( * ) Notice: Subject to any disclaimer, the term of this patent is extended or adjusted under 35 U.S.C. 154(b) by 343 days.

(21) Appl. No.: 12/547,867

(22) Filed: Aug. 26, 2009

(65) Prior Publication Data
US 2011/0050771 A1 Mar. 3, 2011

(51) Int. Cl.
*G01B 11/30* (2006.01)
*G01B 11/14* (2006.01)
(52) U.S. Cl. .................. 356/600; 356/601; 356/620
(58) Field of Classification Search .................. None
See application file for complete search history.

(56) References Cited

U.S. PATENT DOCUMENTS

| | | | | |
|---|---|---|---|---|
| 2,930,228 | A * | 3/1960 | Lawrence et al. | 73/159 |
| 4,633,057 | A * | 12/1986 | Wilson et al. | 219/121.63 |
| 7,423,744 | B2 * | 9/2008 | Uesugi et al. | 356/237.2 |
| 2007/0070099 | A1 * | 3/2007 | Beer et al. | 347/8 |

* cited by examiner

*Primary Examiner* — Gregory J Toatley
*Assistant Examiner* — Jarreas C Underwood
(74) *Attorney, Agent, or Firm* — C. G. Mersereau; Nikolai & Mersereau, P.A.

(57) ABSTRACT

An automatic scan and mark apparatus has a machine tool, a location detection module, a laser detector, an ink jet and a control computer. The machine tool has a movable module and a stage. The stage mounts and holds a specimen having a scraped surface. The control computer controls the location detection module to determine a position of the movable module, controls the laser detector to detect a surface morphology of the scraped surface in a measurement range, and activates the ink jet to eject inks on high points of the scraped surface of the specimen. Thus, the surface morphology is built automatically and high points are screened out and marked by colored ink. Manufacturer may easily redo scraping of determined high points based on the marked location on the specimen without burdensome measurement.

4 Claims, 5 Drawing Sheets

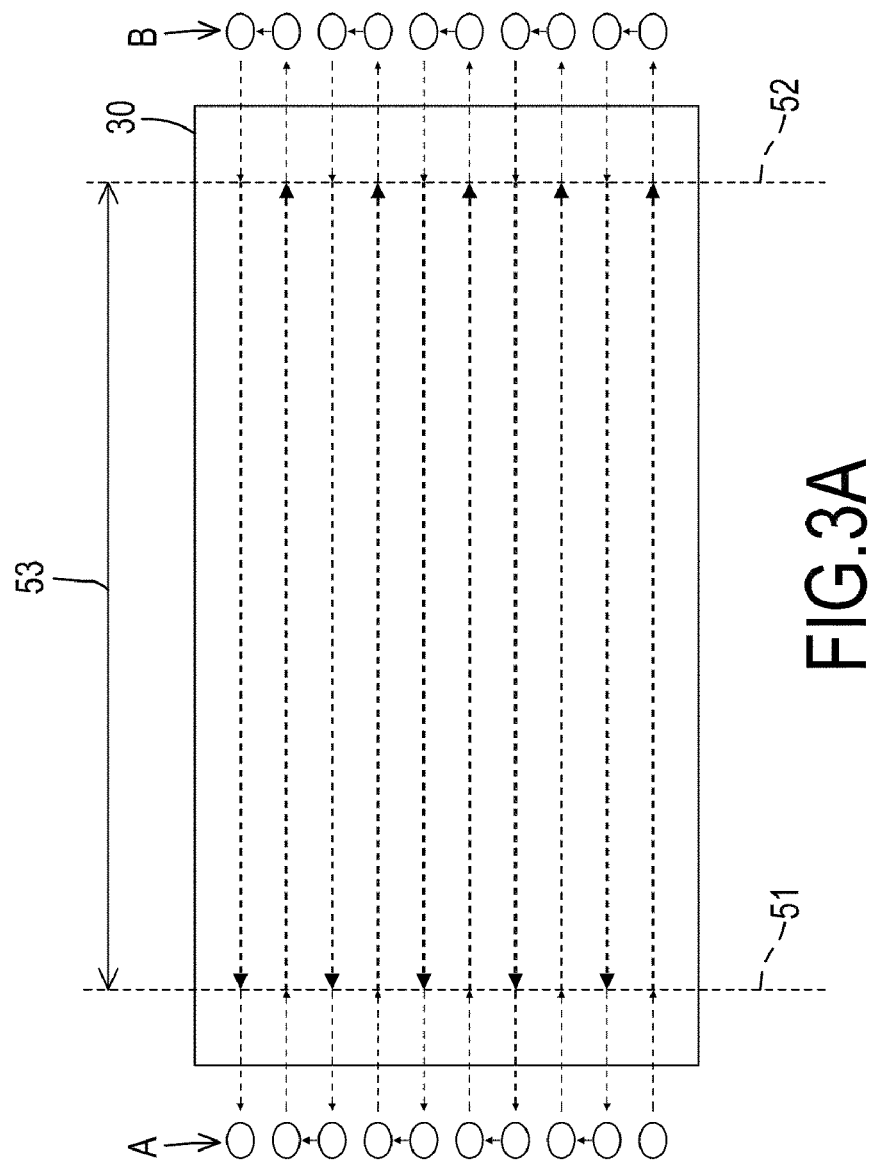

AUTOMATIC SCAN AND MARK APPARATUS

BACKGROUND OF THE INVENTION

1. Field of Invention

The present invention relates to a scan and mark apparatus, and more particular to a laser scanning and paint marking apparatus for measuring and marking a surface of a scraped element.

2. Description of the Related Art

Scraping is an important process for key elements in machine tools. For instance, a hard rail for a machine tool has to be scraped to improve retention of lubricant thereon and improve movement of an element on the hard rail due to such lubrication.

Monitoring a surface roughness of the scraped surface is very important to maintain functions of the hard rail element, since the surface roughness may affect mobility of the moving element on the hard rail. A conventional method for determining the surface roughness of the scraped surface comprises the following steps: painting ink on the scraped surface, sliding the moving element on the scraped surface so ink on a higher area will be removed and be found, and measuring a height of the higher area with a measuring tool.

Measurement result of the described conventional method is not precise since the results of the conventional method are easily affected by human error.

The present invention provides an automatic scan and mark apparatus that can be adapted to measure a morphology of a scraped surface automatically to obviate or mitigate the shortcomings of the conventional measuring method.

SUMMARY OF THE INVENTION

The primary objective of the present invention is to provide a scan and mark apparatus that is capable of detecting a surface morphology of a scraped element placed on a stage of a machine tool when the machine tool is moving.

The automatic scan and mark apparatus has a machine tool, a location detection module, a laser detector, an ink jet and a control computer. The machine tool has a movable module and a stage. The stage receives a specimen having a scraped surface. The control computer controls the location detection module determining a position of the movable module, controls the laser detector detecting a surface morphology of the scraped surface in a measurement range, and activates the ink jet to eject inks on high points of the scraped surface of the specimen. Thus the surface morphology is built automatically and high points are screened out and marked by colored ink. Manufacturer may easily redo scraping of identified high points to improve surface profile based on the marked location on the specimen without burdensome measurement.

Other objectives, advantages and novel features of the invention will become more apparent from the following detailed description when taken in conjunction with the accompanying drawings.

BRIEF DESCRIPTION OF THE DRAWINGS

FIGS. 3A and 3B are top views of moving routes on a specimen of the automatic scan and mark in FIG. 1;

DETAILED DESCRIPTION OF THE INVENTION

Figure 1:
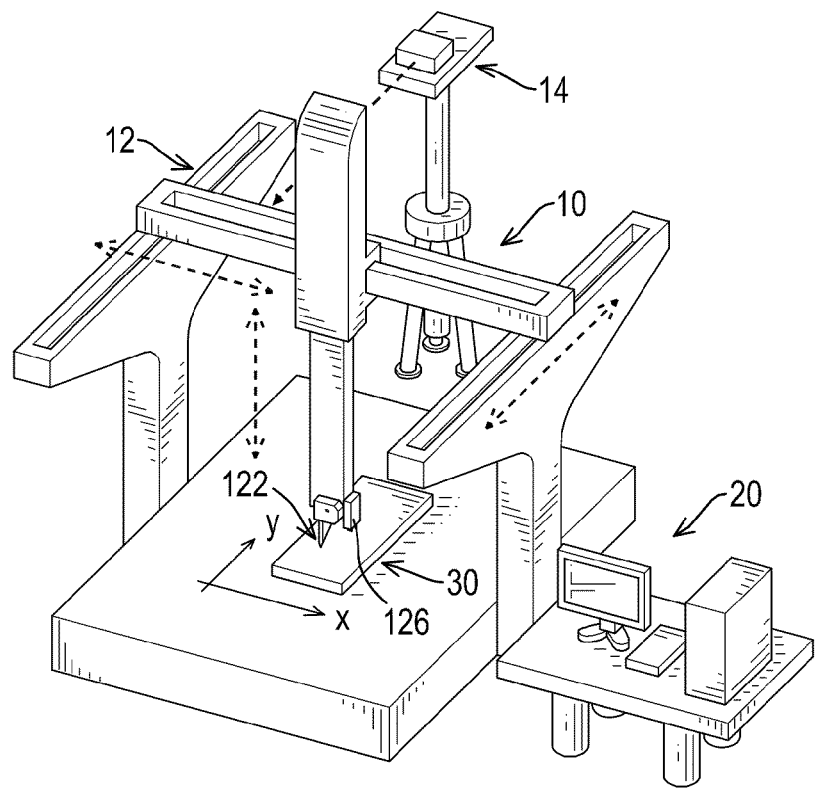
FIG. 1 is a perspective view of an automatic scan and mark apparatus in accordance of the present invention.
Figure 2:
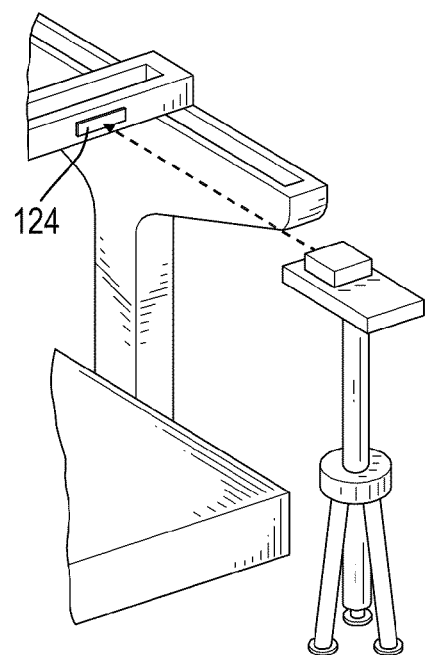
FIG. 2 is a partial perspective view of the automatic scan and mark apparatus in FIG. 1.

With reference to FIGS. 1 and 2, an automatic scan and mark apparatus in accordance with the present invention comprises a machine tool (10), a location detection module (14), a laser detector (122), an ink jet (126) and a control computer (20).

Figure 4:
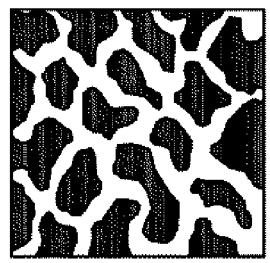
FIG. 4 shows examples of scraping surfaces of specimens mounted on the automatic scan and mark apparatus in FIG. 1.
Figure 4:
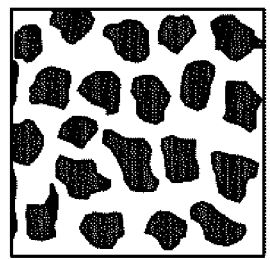
Figure 4:
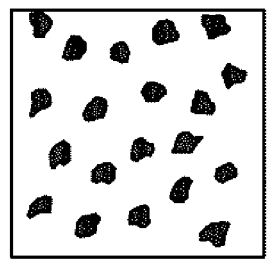
Figure 4:
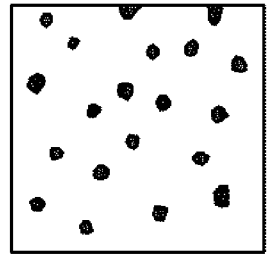

The machine tool (10) may be a metal cutting machine tool, a vertical lathe, a machining center, a computer numerical controlled (CNC) machine tool or the like that comprises a movable module (12) and a stage. The movable module (12) is a machining arm of the machine tool (10) that is controlled by the machine tool (10) to move three-dimensionally with respect to the stage and has a distal end extending toward the stage. The distal end of movable module (12) holds a machining tooling or a machining blade thereon and is controlled and scheduled to perform machining. The stage is used to mount and hold a specimen (30). The specimen (30) has a scraped surface. With reference to FIG. 4, some types of scraped surface are shown, wherein black areas mark determined high points.

The location detection module (14) may be a linear scale or a laser distance detector of the machine tool (10) that is controlled to detect a position of the movable module (12). In a preferred embodiment of the present invention, the location detection module (14) is a laser distance detector that continuously emits laser light toward a reflecting surface (124) of the movable module (12) and determines a distance between the location detection module (14) and the movable module (12) by reflected laser light.

The laser detector (122) is an optical distance sensor, may be is a laser distance meter or a laser displacement sensor, is securely mounted on the distal end of the movable module (12), and is controlled to measure a surface morphology of the scraped surface. In a preferred embodiment of the present invention, the laser detector (122) is a laser displacement sensor comprising a laser emitter and a charge-coupled device (CCD) receiver. The laser emitter emits a laser light to the scraped surface, thus a reflected laser light from the scraped surface is received by the CCD receiver. Therefore, the laser detector (122) may determine a surface morphology of the scraped surface.

The ink jet (126) is a multi-color ink jet, is securely mounted on the distal end of the movable module (12), and is controlled to eject colored inks toward the scraped surface of the specimen (30) at specific positions.

The control computer (20) is electronically connected to the location detection module (14), the laser detector (122) and the ink jet (126). The control computer (20) performs an automatic scan and mark program to control the location detection module (14) determining the position of the movable module (12), to control the laser detector (122) detecting the surface morphology of the scraped surface in a measurement range, and to active the ink jet (126) to eject colored ink on high points of the scraped surface of the specimen (30). The measurement range is predefined in the control computer (20) and the control computer (20) determines the position of the laser detector (122) according to detection results of the location detection module (14).

Figure 3B:
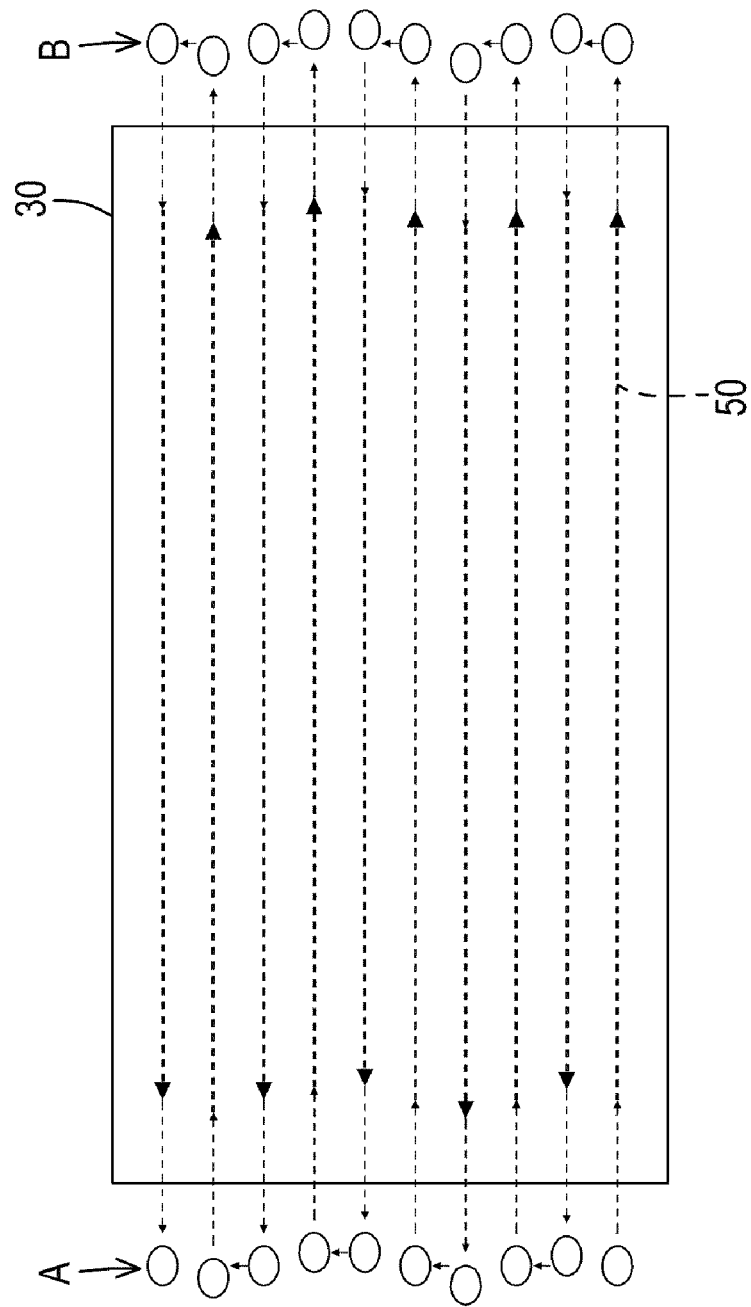
Figure 5:
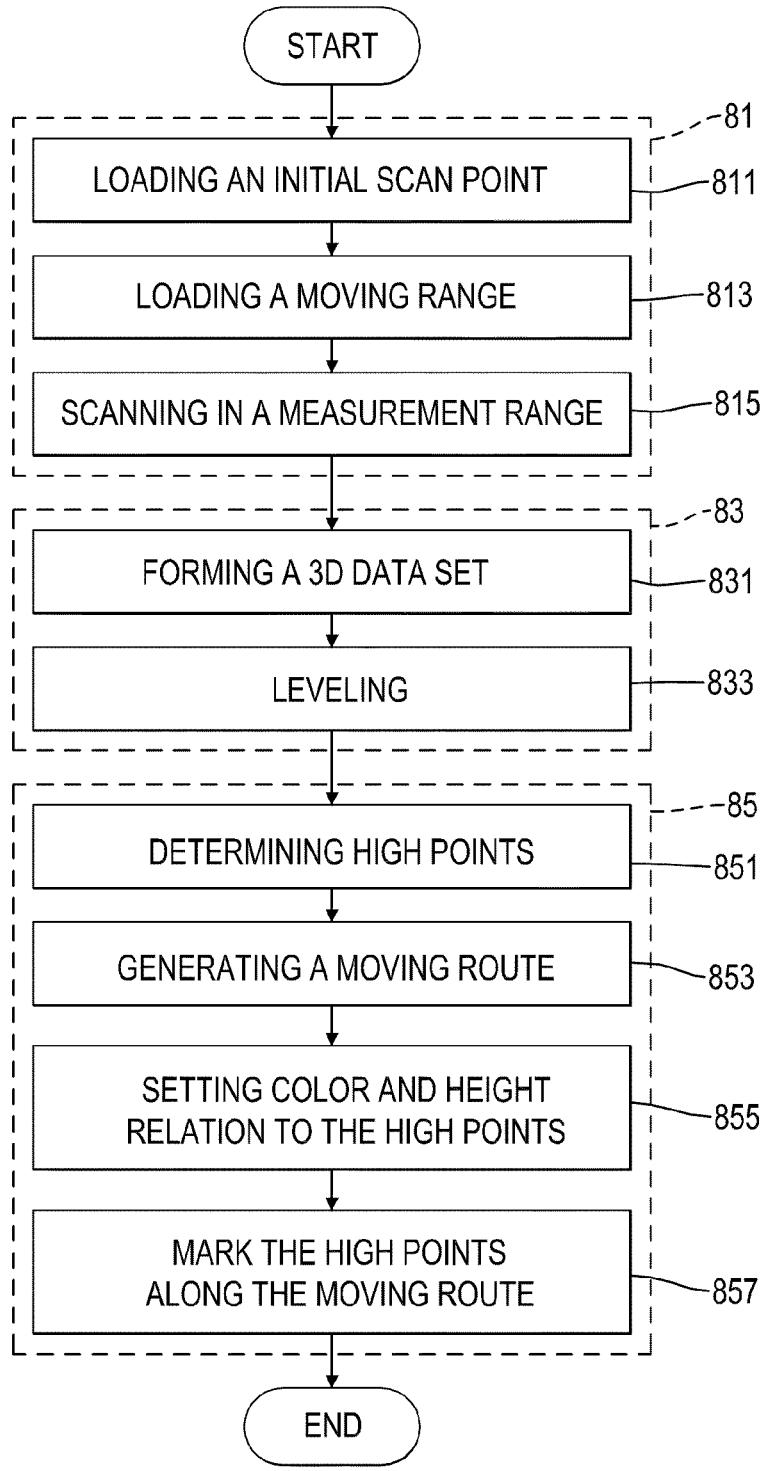
FIG. 5 is a block diagram of an automatic scan and mark method in accordance with the present invention.

With reference to FIGS. 3A, 3B and 5, the automatic scan and mark program comprises steps of scanning (81), processing data (83) and marking high points (85).

The step of scanning (81) comprises steps of loading an initial scan point (811), loading a moving range (813) and scanning in a measurement range (815).

An initial scan point (51) and a moving range (53) are inputted and defined into the control computer (20) before the automatic scan and mark program is performed. After the initial scan point (51) and the moving range (53) are defined, a scanning area of the specimen (30) is then defined.

Thus, in the step of loading an initial scan point (811) and the loading a moving range (813), the control computer (20) loads the initial scan point (51) and the moving range (53) so as to control and limit the laser detector (122) detecting the surface morphology of the specimen (30) between the initial scan point (51) and an end point (52). The objective of defining the initial scan point (51) and end point (52) is to prevent an offset mistake in the scanned results. Take FIG. 3B as an example, the control computer (20) controls the laser detector (122) to scan the morphology of the specimen (30) when the machine tool (10) controls the movable module (12) to move along a moving route (50). Therefore, the offset mistake occurs when the laser detector (122) continuously scanning during the movable module (12) is moving, since the speed of the movable module (12) might be changed especially at return points A and B. That is, a moving speed of the movable module (12) is changed near the return points A and B but a sampling rate of the laser detector (122) is not, sampling distances are no longer constant value in this situation.

In the step of scanning in a measurement range (815), the control computer (20) controls the laser detector (122) to scan and to detect the surface morphology of the scraped surface of the specimen (30) when the laser detector (122) is positioned in the measurement range, where the control computer (20) may determine the position of the laser detector (122) according to the detection results of the location detection module (14).

The measurement range is defined by the control computer (20) according to the initial scan point (51) and the moving range (53). When the laser detector (122) is not inside the measurement range, the control computer (20) controls the laser detector (122) to stop scanning. Thus, offset mistakes are prevented since the laser detector (122) scans the morphology of the scraped surface only in the measurement range and screens the speed change at points A and B.

The step of processing data (83) comprises steps of forming a 3D data set (831) and leveling (833).

In the step of forming a 3D data set (831), the control computer (20) collects scanning results continuously from the laser detector (122) as a 3D data set. The 3D data set comprises multiple measurement points.

In the step of leveling (833), the control computer (20) removes a systematic tilt in the 3D data set. The systematic tilt may come from a tilt stage or the specimen (30) without uniform thickness. When performing the leveling (833), the control computer (20) defines a tile trend existing in the measurement points from calculating a slope of the 3D data set and offsets the measurement points according to the slope. For instance, the control computer (20) may firstly group the measurement points as a left group, a central group and a right group according to position of the specimen (30). Secondly, the control computer (20) compares height averages of the left group, central group and right group to define the tile slop of the 3D data set, and then adds offset to the measurement points.

The step of marking high points (85) comprises steps of determining high points (851), generating a moving route (853), setting color and height relation to the high points (855) and marking the high points along the moving route (857).

In the step of determining high points (851), the control computer (20) loads a preset height threshold, compares each measurement point with the height threshold and defines measurement points over the height threshold as high points.

In the step of generating a moving route (853), the control computer (20) plans a moving route passing each high point and sends the moving route to the machine tool (10).

In the step of setting color and height relation to the high points (855), the control computer (20) defines color to the high points according to a distance of each high point to the height threshold. For instance, black, red, and blue colors may respectively be assigned to the distance of 0.2 mm, 0.1 mm and 0.05 mm from the height threshold.

In the step of marking the high points along the moving route (857), the control computer (20) activates the ink jet (126) to mark each high point with defined colored ink when the movable module (12) is controlled by the machine tool (10) to move along the moving route.

In summary, the present disclosure is able to build the digitized 3D data set of the scraped surface of the specimen (30) and automatically to mark the high points with colored ink on the scraped surface of the specimen (30). Therefore, manufacturers may easily acquire the surface morphology of the specimen (30) and redo scraping of high points based on the marked location on the specimen (30) without burdensome measurement.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. An automatic scan and mark apparatus comprising
a machine tool comprising
a stage for receiving a specimen with a scraped surface;
a movable module controlled to move three-dimensionally with respect to the stage and having a distal end extending toward the stage;
a location detection module controlled to detect a position of the movable module;
a laser detector having an optical distance sensor, securely mounted on the movable module adjacent to the distal end of the movable module and controlled to measure a surface morphology of the scraped surface;
a multi-color ink jet securely mounted on the movable module adjacent to the distal end of the movable module and controlled to eject colored inks toward the scraped surface of the specimen at specific position; and
a control computer electronically connected to the location detection module, the laser detector and the ink jet, wherein
the control computer controls the location detection module to determine the position of the movable module;
the control computer controls the laser detector to detect the surface morphology of the scraped surface in a measurement range; and
the control computer activates the ink jet to eject inks on high points of the scraped surface of the specimen, wherein the control computer comprises an automatic scan and mark program, the automatic scan and mark program comprising the steps of:

leveling, the control computer removes a systematic tilt in a 3D data set;

determining high points, the control computer loads a preset height threshold, compares each measurement point with the height threshold and screens the measurement points over the height threshold as a high point;

generating a moving route, the control computer plans a moving route passing each high point and sends the moving route to the machine tool;

setting color and height relation to the high points, the control computer defines color to the high points according to a distance of each high point to the height threshold;

marking the high points along the moving route, the control computer activates the ink jet to mark each high point with defined colored ink when the movable module is controlled by the machine tool to move along the moving route.

2. The automatic scan and mark apparatus as claimed in claim 1, wherein the automatic scan and mark program additionally comprises the steps of:

loading an initial scan point;

loading a moving range;

scanning in a measurement range, the control computer controls the laser detector to detect the surface morphology of the scraped surface of the specimen when the laser detector is positioned in the measurement range, where the control computer determines the position of the laser detector according to detection results of the location detection module;

forming a 3D data set, the control computer collects scanning results continuously from the laser detector as a 3D data set, the 3D data set comprises multiple measurement points.

3. The automatic scan and mark apparatus as claimed in claim 2, wherein the location detection module is a linear scale.

4. The automatic scan and mark apparatus as claimed in claim 2, wherein the location detection module is a laser distance detector.

* * * * *